June 12, 1951           H. H. VICKERS           2,556,306

DEVICE FOR CLAMPING INNER TUBE STOCK

Original Filed June 2, 1947           4 Sheets-Sheet 1

Herbert H. Vickers Inventor

By W. O. J Hilman Attorney

June 12, 1951     H. H. VICKERS     2,556,306
DEVICE FOR CLAMPING INNER TUBE STOCK Original Filed June 2, 1947     4 Sheets-Sheet 3

Herbert H. Vickers, Inventor
By W. O. T. Heilman Attorney

June 12, 1951 H. H. VICKERS 2,556,306
DEVICE FOR CLAMPING INNER TUBE STOCK

Original Filed June 2, 1947 4 Sheets-Sheet 4

Herbert H. Vickers Inventor
By W. O. J Heilman Attorney

Patented June 12, 1951

2,556,306

UNITED STATES PATENT OFFICE 2,556,306

DEVICE FOR CLAMPING INNER TUBE STOCK

Herbert H. Vickers, Union, N. J., assignor to Standard Oil Development Company, a corporation of Delaware Original application June 2, 1947, Serial No. 751,804. Divided and this application January 22, 1949, Serial No. 72,164

4 Claims. (Cl. 154—9)

1

This application is a division of an earlier application Serial No. 751,804, filed June 2, 1947.

This invention relates to improvements in apparatus for the splicing of rubber articles.

Methods and machines for the automatic splicing of rubber articles and particularly inner tubes are disclosed in U. S. Patent Nos. 2,024,577; 2,024,578; 2,040,466; 2,272,881; 2,273,463 and 2,273,464. In practicing the inventions of the above-enumerated patents, two ends of the inner tube stock are clamped flat in a pair of aligned clamping devices, and while so held, said ends are cut off transversely and heated. Thereafter the freshly cut ends are brought forcibly together and joined preparatory to vulcanization.

The above mentioned methods and machines are, in general, highly satisfactory for making inner tubes of natural rubber since natural rubber inner tube compositions are extremely pliable, have a very high degree of tack, are easy to flatten completely in the clamps and have an enveloping quality that enables them to form a satisfactory bond between two surfaces even though separated by a coating of talc.

Butyl rubber, or the copolymers of an isoolefin such as isobutylene and a multi-olefin such as butadiene and isoprene prepared at low temperatures in the presence of Friedel-Crafts catalysts as described in U. S. Patent 2,356,128, dated August 22, 1944, by Thomas and Sparks, have been found to be vastly superior to natural rubber as a gas barrier and therefore superior as inner tube stock material since tires having inner tubes made thereof require inflation much less frequently. It has been found, however, that it is extremely difficult to manufacture inner tubes of butyl rubber by the above mentioned methods and machines without forming a considerable number of defective tubes or rejects. Properties contributing to the difficulty are (1) the difficulty of cutting the tube stock to a perpendicular and true face, (2) the resistivity of unevenly cut faces to flattening or matching on pressure contact in the butting of the tube ends, (3) the resistivity to flattening of the tube folds causing the formation of a hollow core within the flattened tube folds; and (4) the tendency to crack at the tube folds.

It is the object of the present invention to provide a clamp which is capable of flattening inner tube stocks, including those prepared from butyl rubber, in such a manner that the formation of a hollow core within the flattened tube folds is substantially avoided. It is also an object of this invention to provide a clamp which

2 avoids or overcomes the defects attributable to the scissor-like closing action of ordinary clamps.

Another object of this invention is to provide a clamp with means for exerting a greater pressure upon the folds of the inner tube stock.

These and other objects will appear more clearly from the detailed specification and claims which follow.

It has now been found that inner tube stocks, including those prepared from butyl rubber can be substantially completely flattened in an inner tube splicing machine clamp closing with a scissor-like action, such as the clamps of Fig. 2 of the Campbell et al. U. S. Patent 2,273,463 if the face of the clamp is so shaped that it first contacts the tube stock at some point other than at the rear of the clamp or at the edge near the pivot point of the clamp preferably closing upon the two folds of the tube first and that flattening of the tube stock in the clamp can be further improved by providing the laminations overlying the folds of the tube with projecting teeth at the front edge of the clamps for pressing and compacting the tube stocks at the fold thereby closing up the hollow core and assuring correct alignment of the cut tube ends when brought into abutment. It has also been found that cutting or damage at the tube fold adjacent the pivoted point of the clamp can be avoided by making the lamination which contacts this fold wider, i. e., two or three times as wide as the ordinary lamination and preferably so shaped that it conforms to the curved contour of the tube fold.

Reference is made to the accompanying drawing wherein several embodiments of this invention are illustrated. In the drawing, Figure 1 is a detailed view of a pair of clamping arms in perspective with parts cut away showing convex faced laminated clamps in accordance with the present invention.

Figure 1:
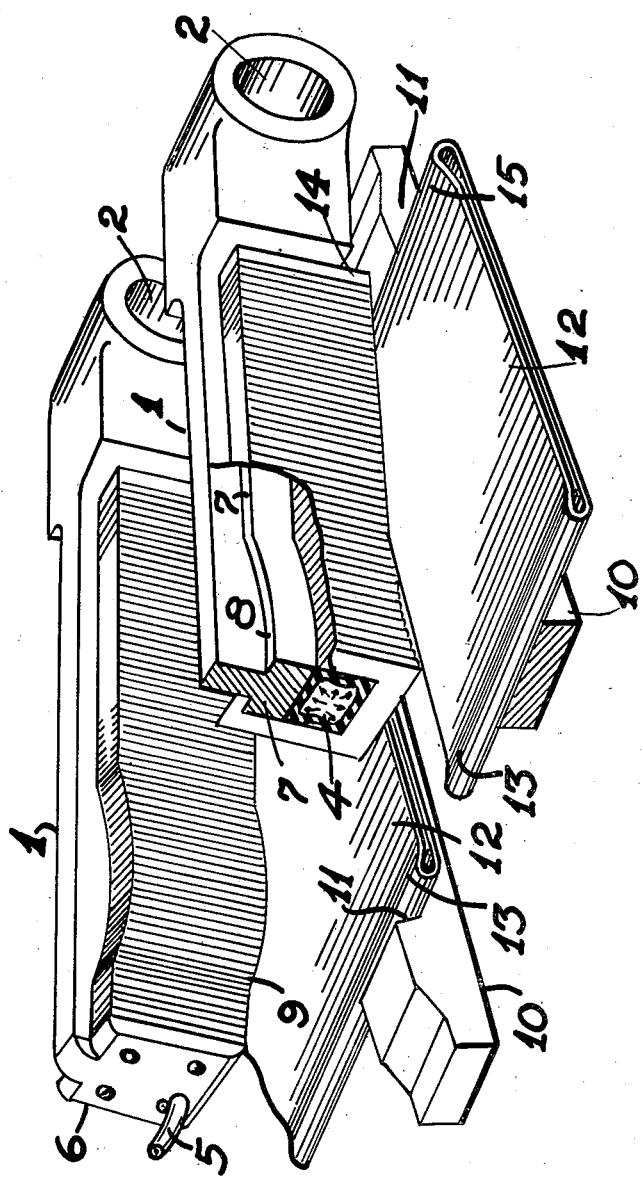

Referring to the drawing, it is noted that for purposes of simplification, details of the splicing machine as a whole have been omitted since they form no part of the present invention. It will be understood, however, that the clamps, cutting knives and the like shown in the drawings are mounted in a machine such as that shown in U. S. Patent 2,273,463, dated February 17, 1942, to J. F. Campbell et al., in substantially the same way as the clamps 16 and 18 and the trimming knives 20 of that patent.

As shown in Figure 1, the clamps comprise a pair of supporting arms 1, pivotally supported at 2 upon a shaft which is connected to suitable power means, not shown, for moving the clamps into operative or tube engaging position and into operative or tube releasing position. Each supporting arm 1 is shaped like an inverted T and carries along its length a multiplicity of U-shaped laminae 3 which serve as active tube clamping members when the supporting arms are brought into tube-engaging position. An air pressure bag 4 is arranged in known manner between the bottom of the supporting arms 1 and the laminae 3, an air hose connection 5 being provided in the end plate 6 for supplying air under pressure to the bag 4. In inoperative position the laminae are supported upon the shoulders 7 of the supporting arms 1. The shoulders 7 are cut away to form a concave supporting surface at 8, the laminae presenting a convex face 9 corresponding to the concavity in the shoulders of the supporting arms. If the concave portion is provided in the supporting arm by machining away a part of the shoulder, it is ordinarily desirable to incorporate a filler piece on the underside of the supporting arm beneath and of substantially the same size as the concavity in order to prevent undue extension of the air pressure bag at this region.

Lower clamp dies 10 provided with abutments 11 support the inner tube stock 12 during clamping, cutting and splicing of the tube stock. The abutments 11 provide lateral support for and insure correct alignment of the tube stock.

In order to get the best effect from this new shaped clamp arm, it is necessary to have a slight initial pressure on the air bag in the clamp arm laminations. This pressure, normally about 10–15 pounds is obtained by advancing the cam controlling the timing of the initial pressure to the air bags to coincide with the cam operating the clamp arm cylinders so that air at the said pressure goes into the clamp air bags at the same time that the clamps are actuated and before they actually close upon the tube stock. When the clamp is closed, pressure within the air bag is increased to about 30 to 90 lbs. per square inch in order to bring the laminae up to full clamping pressure which is maintained during the remainder of the splicing cycle, i. e. during the trimming of the free ends of the tube stock, the movement of the clamped, freshly trimmed ends of the tube stock into abutment and the maintenance of the tube stock in contact under pressure until a firm splice is formed.

The convex face 9 is preferably arranged as shown in Figure 1 so that it contacts the tube stock 12 at the fold 13 at the front of the clamp before or at about the same time that the laminae 14 at the back of the clamp contacts the fold 15. In this way, the clamps press the excess tube stock away from the folds towards the center of the tube stock where it is more easily flattened. In the usual clamp having a flat surface, contact is made at the fold at the rear of the clamp and all the excess stock is forced toward the front of the clamp, the fold there binding against the abutment, preventing flattening of the tube or in some cases, where the excess may be sufficient to overlap the abutment, causing a pinching of the tube stock and consequently a defect in if not a complete failure of the splice at this point.

Figure 2:
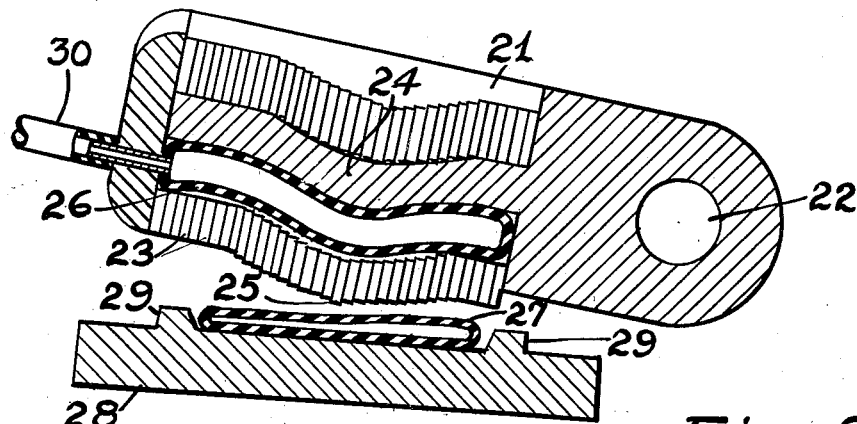
Figure 2 is a cross section through one form of convex faced laminated clamp.

The clamp shown in cross section in Figure 2 differs from that in Figure 1 by having the convexity in the clamp face opposite the center of the tube. The clamp comprises a supporting arm 21 which is pivotally supported at 22 for movement into operative clamping position and into inoperative or releasing position. Mounted on the supporting arm 21 which in cross section is shaped like an inverted T, are a plurality of laminae 23 which serve as active clamping members when the supporting arm is brought into operative clamping position. Part of the top portion of the supporting arm 21 is cut away as at 24 permitting the clamping laminae to present a substantially convex shaped face 25. An inflatable pneumatic bag 26 is provided within the clamp for applying suitable pressure to the laminae. The inner tube stock 27 is arranged on the supporting die 28 between lateral supporting members or abutments 29. The pneumatic bag 26 is connected to air line 30 supplying air at the desired pressure as described above. In this arrangement, the clamp presses the excess stock in two directions from the center, towards the folds thereby substantially reducing the fold at the front of the clamp.

Figure 3:
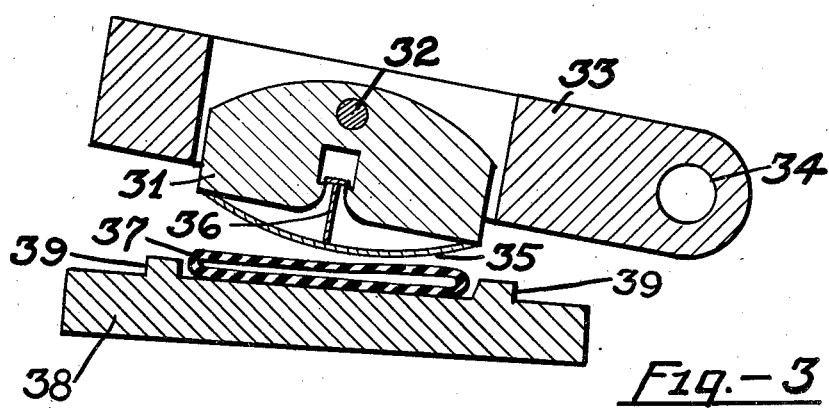
Figure 3 is a cross section through a solid type clamp having a convex contact surface.

Figure 3 shows a solid clamp 31 pivotally mounted at 32 on a supporting arm 33 which in turn is pivotally supported at 34. In order to roll out corrugation in the inner tube stock upon closing, the clamp 31 is provided with a thin curved spring plate 35 which is secured to the clamp by means of a flexible suspension bracket 36. The spring plate 35 is arranged at the front edge of the clamp 31 or, if the clamp is provided with a suitable recess for receiving the spring plate upon closing of the clamp thereby permitting the face of the clamp to exert sufficient pressure upon the tube stock, the spring can be located some distance from the front edge of the clamp. Particularly if the spring plate is arranged at the front edge of the clamp and thereby becomes the active clamping element, other expedients can be provided. For example, the recess for receiving the spring plate can be made of varying depth, preferably shallower near its ends causing a certain amount of protrusion of the spring plate beyond the surface of the clamp thereby increasing the pressure upon the tube stock particularly at the folds.

As in the previous embodiments, the inner tube stock 37 is supported on a lower clamping die 38 between abutments 39. Upon pivotal movement of the supporting arm 33 about the support 34 the clamp member 31 is brought into contact with the inner tube stock between the two lateral abutments 39. Contact is first made by the spring plate member 35 which tends to roll or iron out any bulges in the tube stock in two directions similarly to the laminated clamp of Fig. 2.

Figure 4:
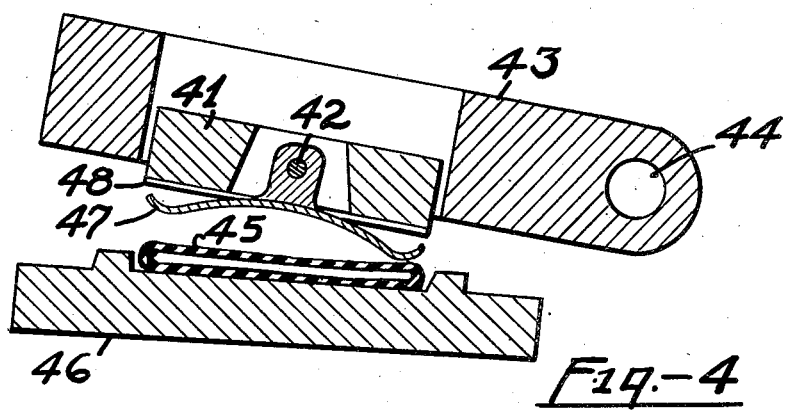
Figure 4 is a cross section through a solid type clamp having a double convex contact surface.

Figure 4 also shows a solid clamp such as that of Figure 3. In this embodiment, the solid clamp 41 is pivotally mounted at 42 on the supporting arm 43. The supporting arm 43 is pivotally mounted at 44 for movement into and out of clamping engagement with the tube stock 45 supported on the lower clamping die 46. A doubly curved spring plate 47 is also pivotally mounted in the clamp 41 at 42 and is designed to contact both folds of the tube at substantially the same time in order to press any excess stock toward the center of the tube. The die 41 is provided with a groove or recess 48 in which the spring plate 47 fits when the clamp is closed.

Figure 5:
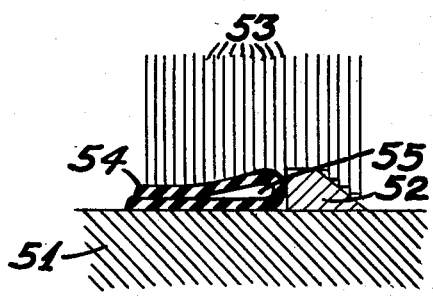
Figure 5 is an enlarged cross section through a portion of the tube directly in front of the laminated clamp showing the hollow core which is formed at the tube fold.
Figure 6:
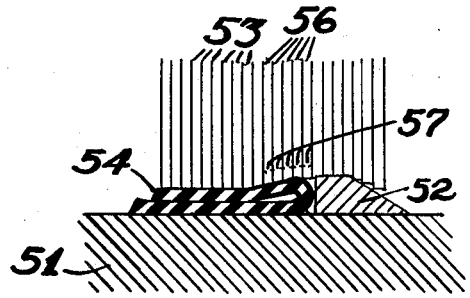
Figure 6 is an enlarged cross section through a portion of the tube directly in front of a clamp provided with projecting teeth on the front edges of the laminations contacting the tube fold for flattening the tube and substantially eliminating the hollow core at the tube fold.

Figure 5, 51 is the supporting die provided with an abutment or lateral support 52 and 53 are the laminae of a clamp such as is shown in Figure 1. The rubber stock is shown at 54 and due to the resistance to flattening, particularly in the case of butyl rubber stocks, forms a hollow core 55 at the fold which resists flattening by the ordinary laminae 53. This hollow core can be substantially eliminated as shown in Figure 6, by providing the laminations 56 which contact the tube fold with projecting teeth 57 at their front edges for intensifying the pressure at the fold reducing the hollow core to such an extent as to be inconsequential. It is obvious that the smaller the hollow core at the tube folds the more certain that the tubes will be in correct alignment when brought into abutment thereby assuring the formation of a sound splice.

Figure 7:
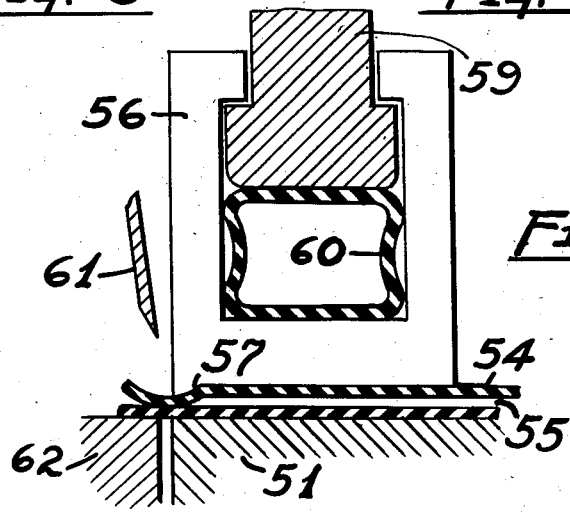
Figure 7 is a side elevation showing a lamination having a projecting tooth for flattening the tube fold.

The projecting teeth 57 on the laminae 56 are more clearly shown in side elevation in Figure 7 showing a complete lamina 56 with a projecting tooth 57 at its front edge for compacting the tube stock at the tube fold. The laminae are carried on supporting arm 59 and are forced into clamping engagement with the tube stock 54 on the supporting die 51 by the action of the pneumatic bag 60. The free ends of the tube stock 54 are cut in known manner by the trimming knife 61 working against the cutting anvil 62.

Figure 8:
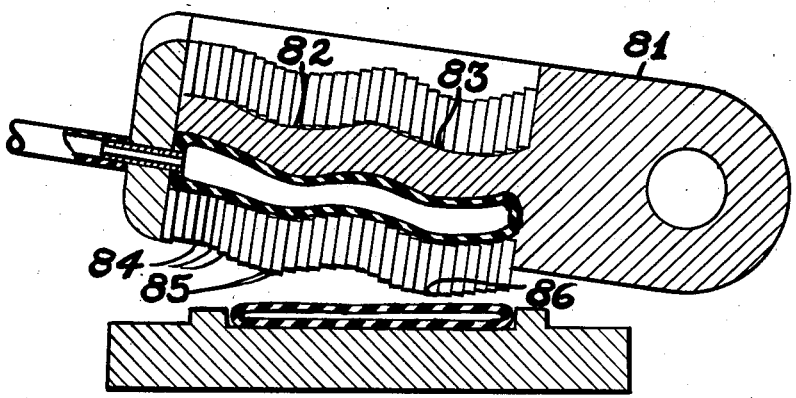
Figure 8 is a cross section through a laminated clamp having a double convex face.

The clamp shown in Figure 8 is quite similar to that of Figure 2 is action but in this embodiment the supporting arm 81 is cut away at two parts 82 and 83 so that the laminae 84 present two convex portions 85 and 86 for contact with the tube stock. This arrangement permits a four-way ironing out or smoothing of the tube stock, i. e. from the center of each of the convex faces to the outer edges of the tube stock and from the center of said convex faces to the center or mid portion of the tube stock.

Figure 9:
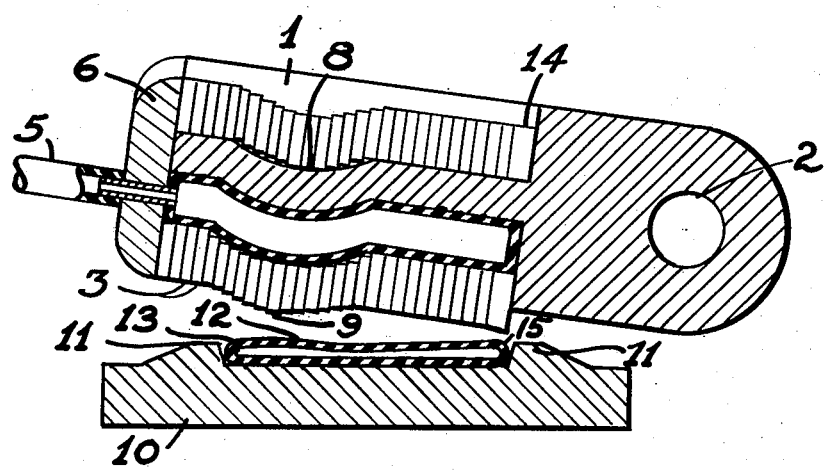
Figure 9 is a cross section through a convex faced laminated clamp which is further provided with an extra wide lamina for minimizing clamp damage to the tube at the fold adjacent the pivot point of the clamp.

Figure 9 is a cross section through the clamp of Figure 1 and is the preferred embodiment of this invention. 1 is the supporting arm for a laminated clamp which is pivotally supported at 2 for movement into operative clamping position and into inoperative or releasing position. A plurality of laminae 3 are mounted on the supporting arm 1 and the latter is partially cut away as at 8 in order that the laminae may present a convex face 9 to the inner tube stock 12 at the side farthest removed from the pivot point of the clamp. The inner tube stock is supported as described above on supporting die 10 between the abutments 11. With the convex face 9 so arranged as to contact the tube stock 12 at the fold 13 adjacent the abutment at the front of the clamp, as shown, the other laminae contact the tube stock substantially simultaneously at the fold 15 adjacent the abutments at the rear of the clamp causing the clamp to press the tube stock from the folds toward the middle thereby reducing the hollow cores formed at the folds and bringing the greatest amount of the slack in the tube stock to the mid portion of the tube stock where it is relatively easily flattened by compressive action since no folds are present in the tube at this part.

Since the relatively narrow laminae 3 present several rather sharp edges to the tube stock at the folds, particularly at the fold adjacent to the pivotal point of the clamp where the laminae exert their greatest compressive action during the closing of the clamp on the tube stock, it is desirable in some cases to provide a lamina 14 which is several times thicker than the remaining laminae at the rear of the clamp for contact with the fold 15 in the tube stock adjacent the lateral support. This extra-wide or thick lamina 14 is preferably provided with a face for contacting the tube stock which conforms to the curvature of the fold or is tangential to the curvature in order to avoid applying a sharp edge of the lamina to the tube stock.

It will be apparent from the foregoing description that a novel method and means for splicing rubber inner tubes has been provided. While a limited number of embodiments have been shown it will be understood that this invention is not limited thereto since numerous variations are possible without departing from the scope of the following claims.

What is claimed is:

1. A device for clamping inner tube stock during the splicing thereof comprising a base to receive and laterally contain said article, a supporting arm pivotally mounted for movement toward and away from said base, a plurality of tube stock engaging members freely supported on and movable with said arm toward and from tube stock on said base, teeth on the front edge of the article engaging members which contact the tube folds for compacting the tube stock and substantially eliminating the hollow core at the tube folds and pneumatic means arranged between said supporting arm and said article engaging members for maintaining the said members in contact with the supporting arm while the arm is in inoperative position and for bringing the said members firmly into engagement with the tube stock on the base when the arm is in operative clamping position.

2. A device for clamping inner tube stock during the splicing thereof comprising a base to receive and laterally contain said article, a supporting arm pivotally mounted for movement toward and away from said base, a plurality of tube stock engaging members freely supported on and movable with said arm toward and from tube stock on said base, a concavity in said supporting arm permitting said tube stock engaging members to present a convex shaped face to the tube stock to be clamped, teeth on the front edge of the article engaging members which contact the tube folds for compacting the tube stock and substantially eliminating the hollow core at the tube folds and pneumatic means arranged between said supporting arm and said article engaging members for maintaining the said members in contact with the supporting arm while the arm is in inoperative position and for bringing the said members firmly into engagement with the tube stock on the base when the arm is in operative clamping position.

3. In a device for shaping and clamping deformable articles, said device including a die to receive the articles having upstanding abutment members disposed in spaced relation laterally of the die to contain the articles thereon, an article shaping and clamping member, comprising a support arm extending laterally of the die beyond said abutments and movable toward and away from the die, upwardly facing shoulders lengthwise of said arm, and substantially integral therewith, forming therewith a common under surface of substantially uniform surface contour, laterally aligned concave surface portions in the upper surface of each shoulder and a corresponding convex surface in the common under surface of said arm and shoulders, said concave and convex surface portions being disposed longitudinally of said arm and shoulders intermediate the ends thereof and lying substantially within the extended inner limits of said abutment members, a plurality of U-shaped individual article engaging elements, freely supported on said shoulders for limited movement perpendicularly with reference thereto, and to one another forming therewith an inner chamber defined by said elements and the under surface of said arm and shoulders, and a deformable fluid pressure means within said chamber actuatable to cause said elements to assume an initial surface contour conforming to that of the arm and shoulder under surface, and to apply auxiliary clamping pressure to said elements when engaged with an article by movement of the arm toward said base.

4. In a device according to claim 3 an article shaping and clamping member in which said concave shoulder surface portions and convex common under surface portions are located adjacent the respective ends of said arm in longitudinally spaced relation thereof.

HERBERT H. VICKERS.

REFERENCES CITED

The following references are of record in the file of this patent:

UNITED STATES PATENTS

| Number | Name | Date |
|---|---|---|
| 626,427 | Jones | June 6, 1899 |
| 1,397,409 | Duwelius | Nov. 15, 1921 |
| 2,040,466 | Christy | May 12, 1936 |
| 2,254,596 | Breth et al. | Sept. 2, 1941 |
| 2,273,463 | Campbell et al. | Feb. 17, 1942 |
| 2,273,464 | Campbell et al. | Feb. 17, 1942 |

FOREIGN PATENTS

| Number | Country | Date |
|---|---|---|
| 667,398 | France | June 10, 1929 |
| 394,068 | Great Britain | June 22, 1933 |
| 117,458 | Australia | Sept. 1, 1943 |